(12) United States Patent
Richter et al.

(10) Patent No.: US 8,814,085 B2
(45) Date of Patent: Aug. 26, 2014

(54) FAULT-TOLERANT ACTUATING SYSTEM FOR ADJUSTING FLAPS OF AN AIRCRAFT, COMPRISING ADJUSTMENT KINEMATICS WITH A FIXED PIVOT, AND A METHOD FOR MONITORING AN ACTUATING SYSTEM

(75) Inventors: Martin Richter, Bremen (DE); Andreas Fleddermann, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 275 days.

(21) Appl. No.: 12/991,174

(22) PCT Filed: May 5, 2009

(86) PCT No.: PCT/EP2009/003219
§ 371 (c)(1),
(2), (4) Date: Nov. 23, 2010

(87) PCT Pub. No.: WO2009/135653
PCT Pub. Date: Nov. 12, 2009

(65) Prior Publication Data
US 2011/0062282 A1    Mar. 17, 2011

Related U.S. Application Data

(60) Provisional application No. 61/050,306, filed on May 5, 2008.

(30) Foreign Application Priority Data

May 5, 2008   (DE) .................. 10 2008 022 092

(51) Int. Cl.
*B64C 3/38* (2006.01)
(52) U.S. Cl.
USPC ............ 244/99.4; 244/220; 244/225; 244/87; 244/99.9; 244/211

(58) Field of Classification Search
USPC ...... 244/220, 225, 87, 90 R, 99.2, 99.3, 99.4, 244/99.9, 211–217, 75.1; 701/318
See application file for complete search history.

(56) References Cited

U.S. PATENT DOCUMENTS

| | | | | |
|---|---|---|---|---|
| 3,111,624 | A * | 11/1963 | Farkas | 455/8 |
| 4,035,705 | A * | 7/1977 | Miller | 318/564 |
| 4,608,820 | A * | 9/1986 | White et al. | 60/39.281 |
| 4,649,484 | A * | 3/1987 | Herzog et al. | 701/3 |
| 4,887,214 | A * | 12/1989 | Takats et al. | 701/3 |
| 5,274,554 | A * | 12/1993 | Takats et al. | 701/29.2 |
| 5,493,497 | A * | 2/1996 | Buus | 701/4 |
| 5,743,490 | A * | 4/1998 | Gillingham et al. | 244/99.9 |
| 5,806,805 | A * | 9/1998 | Elbert et al. | 244/195 |
| 5,875,998 | A * | 3/1999 | Gleine et al. | 244/195 |
| 5,913,492 | A * | 6/1999 | Durandeau et al. | 244/82 |
| 6,076,767 | A * | 6/2000 | Farley et al. | 244/78.1 |
| 6,241,195 | B1 * | 6/2001 | Wagner, III | 244/218 |
| 6,299,108 | B1 * | 10/2001 | Lindstrom et al. | 244/213 |
| 6,349,900 | B1 * | 2/2002 | Uttley et al. | 244/82 |
| 6,389,335 | B1 * | 5/2002 | Vos | 701/4 |
| 6,483,436 | B1 * | 11/2002 | Emaci et al. | 340/686.1 |
| 6,526,337 | B2 * | 2/2003 | Gardner | 701/3 |
| 6,622,972 | B2 * | 9/2003 | Urnes et al. | 244/194 |
| 6,704,624 | B2 * | 3/2004 | Ortega et al. | 701/3 |
| 6,705,570 | B1 * | 3/2004 | Degenholtz et al. | 244/99.2 |
| 6,755,375 | B2 * | 6/2004 | Trikha | 244/99.4 |
| 6,776,376 | B2 * | 8/2004 | Collins | 244/213 |
| 6,827,311 | B2 * | 12/2004 | Wingett et al. | 244/99.5 |
| 6,860,452 | B2 * | 3/2005 | Bacon et al. | 244/194 |
| 7,051,975 | B2 | 5/2006 | Pohl et al. | |
| 7,100,870 | B2 * | 9/2006 | Flatt | 244/99.2 |
| 7,226,020 | B2 | 6/2007 | Pohl et al. | |
| 7,464,896 | B2 | 12/2008 | Carl et al. | |
| 7,549,605 | B2 * | 6/2009 | Hanlon et al. | 244/75.1 |
| 7,556,224 | B2 * | 7/2009 | Johnson et al. | 244/175 |
| 7,610,828 | B2 * | 11/2009 | Wingett et al. | 74/424.78 |
| 7,789,345 | B2 * | 9/2010 | Matsui et al. | 244/99.4 |
| 8,074,937 | B2 * | 12/2011 | Carl et al. | 244/194 |
| 2004/0075020 | A1 * | 4/2004 | Trikha | 244/75 R |
| 2005/0029407 | A1 | 2/2005 | Pohl et al. | |
| 2005/0151028 | A1 | 7/2005 | Pohl et al. | |
| 2006/0049308 | A1 | 3/2006 | Good | |
| 2006/0144996 | A1 * | 7/2006 | Carl et al. | 244/99.2 |
| 2006/0289696 | A1 * | 12/2006 | Hanlon et al. | 244/35 R |
| 2007/0080261 | A1 | 4/2007 | Carl et al. | |
| 2007/0145180 | A1 * | 6/2007 | Johnson et al. | 244/13 |
| 2009/0308983 | A1 * | 12/2009 | Jones | 244/227 |

FOREIGN PATENT DOCUMENTS

| | | | |
|---|---|---|---|
| AT | 370885 | T | 5/1983 |
| AT | 415341 | T | 12/2008 |
| CA | 2490843 | A1 | 6/2005 |
| CN | 1882474 | A | 12/2006 |
| DE | 10326799 | B3 | 12/2004 |
| DE | 10353672 | A1 | 6/2005 |
| DE | 10361891 | A1 | 8/2005 |
| DE | 102004047008 | A1 | 3/2006 |
| EP | 1486416 | A1 | 12/2004 |
| EP | 1547917 | A | 6/2005 |
| EP | 1640265 | A | 3/2006 |
| EP | 1739009 | A | 1/2007 |

OTHER PUBLICATIONS

International Search Report for corresponding PCT Application No. PCT/EP2009/003219, Oct. 22, 2009.

International Preliminary Report on Patentability and Written Opinion for PCT Application No. PCT/EP2009/003219, Nov. 18, 2010.

Office Action for corresponding CN Application No. 200980116592.0, dated Oct. 10, 2012.

\* cited by examiner

*Primary Examiner* — Isam Alsomiri

*Assistant Examiner* — Assres H Woldemaryam

(74) *Attorney, Agent, or Firm* — Ingrassia Fisher & Lorenz P.C.

(57) ABSTRACT

A fault-tolerant actuating system with at least one flap, adjustable on a respective wing of an aircraft, and with a control and monitoring device, includes: drive devices that are functionally connected to the control and monitoring device, with one of these drive devices in each case being associated with a flap, where each flap in each case is associated with a drive device, in each case including: two drive motors, two brake mechanisms, where each drive motor is associated with a brake mechanism for stopping rotation of the output of the respective drive motor, a differential that couples the outputs of the aforesaid to the aforesaid in a summing manner, an output shaft for coupling the output of the differential to drive connections, and a differential lock that is functionally connected to the control and monitoring device, which differential lock is coupled to the control and monitoring device in this manner, where each of the brake mechanisms as well as the differential lock can be operated by way of a command signal from the control and monitoring device; adjustment devices, that are coupled to the respective drive device associated with the flap, where each adjustment device in each case includes: a transmission gear unit, an adjustment mechanism and a position sensor that is functionally connected to the control and monitoring device for acquiring the adjustment state of the flap; where the control and monitoring device includes: an actuating function for generating command signals for the drive motors for adjusting the flap, a monitoring function by way of which a command signal is transmitted to both brake mechanisms and to the differential lock for operating the aforesaid when the control and monitoring device based on a comparison of sensor values of the position sensors on two different adjustment devices of a flap determines different adjustment states that exceed a predetermined extent, and a method for monitoring an actuating system.

14 Claims, 2 Drawing Sheets

US 8,814,085 B2

FAULT-TOLERANT ACTUATING SYSTEM FOR ADJUSTING FLAPS OF AN AIRCRAFT, COMPRISING ADJUSTMENT KINEMATICS WITH A FIXED PIVOT, AND A METHOD FOR MONITORING AN ACTUATING SYSTEM

CROSS REFERENCE TO RELATED APPLICATIONS

This application claims priority to PCT Application No. PCT/EP2009/003219, filed May 5, 2009; which claims priority to German Patent Application No. DE 10 2008 022 092.2, filed May 5, 2008, and claims the benefit to U.S. Provisional Patent Application No. 61/050,306, filed May 5, 2008, the entire disclosures of which applications are hereby incorporated by reference.

BACKGROUND

The invention relates to a fault-tolerant actuating system for adjusting flaps of an aircraft, comprising adjustment kinematics with a fixed pivot, and a method for monitoring an actuating system.

By means of the fault-tolerant actuating system for adjusting flaps of an aircraft a number of predetermined failures of components of the actuating system can be compensated for.

Document EP 1 739 009A1 describes an electric control surface actuation system for aircraft flaps and slats. Document EP 1 640 265A1 discloses a control system for a horizontal stabilizer of an aircraft. From the state of the art the adjustment system shown in FIG. 1 is known, with the high-lift system 1 shown in the figure being provided for adjusting at least one landing flap on each wing. FIG. 1 shows two landing flaps for each wing, wherein the wing is not shown in FIG. 1. The following are shown in detail: an inner landing flap A1 and an outer landing flap A2 on a first wing, and an inner landing flap B1 and an outer landing flap B2 on a second wing. In the high-lift system according to the invention it is also possible to use more than two landing flaps for each wing. The high-lift system 1 is operated and controlled by way of a pilot interface that, in particular, comprises an actuating member 3, for example an actuating lever. The actuating member 3 is functionally coupled to a control and monitoring device 5 that transmits control commands by way of a control line 8 for controlling a central drive unit 7.

The drive unit 7, which is arranged centrally, in other words in the fuselage region, comprises two drive motors, for example a hydraulic motor H and an electric drive E, as well as brake mechanisms B1, B2 that are associated with the aforesaid. Furthermore, the central drive unit 7 comprises a differential. The differential is coupled to the output sides of the hydraulic motor M1 and of the electric motor M2 in such a manner that the outputs delivered by the hydraulic motor H and the electric motor are in each case summed, and are transmitted to rotary drive shafts 11, 12. The brake mechanisms B1, B2 can be operated by means of a command signal from the control and monitoring device 5.

For each wing a total of two rotary drive shafts 11, 12, each provided for operating the at least one flap A1, A2 or B1, B2, are coupled to the central drive unit 7. The two rotary drive shafts 11, 12 are coupled to the central drive unit 7 and are synchronised by said drive unit 7. On the basis of corresponding control commands the central drive unit 7 causes the rotary drive shafts 11, 12 to rotate in order to carry out actuating movements of the adjustment devices, which are coupled to the aforesaid, of the respective flap. A torque limiter T can be integrated in a shaft section of the rotary drive shafts 11, 12, which shaft section is situated near the drive unit 7.

On each flap A1, A2 or B1, B2 two adjustment devices are provided. In the high-lift system shown in FIG. 1, on each flap two adjustment devices are arranged, namely the adjustment devices A11, A12 or B11, B12 on the inner flaps A1 and B1, and the adjustment devices A21, A22 or B21, B22 on the outer flaps A2 and B2.

Below, there is a description of the adjustment devices A11, A12, B11, B12, A21, A22, B21, B22, wherein the components of various adjustment devices with the same function in each adjustment device comprise the same reference characters.

Each one of the adjustment devices A11, A12, B11, B12, A21, A22, B21, B22 is associated with a transmission gear unit 20, adjustment kinematics 21 with a fixed centre of flap rotation, and a position sensor 22. The transmission gear unit 20 is mechanically coupled to the respective rotary drive shafts 11, 12 and translates a rotary movement of the respective rotary drive shafts 11, 12 to an adjustment movement of the flap region that is coupled to the respective adjustment devices A11, A12, B11, B12, A21, A22, B21, B22. On each adjustment device A11, A12, B11, B12, A21, A22, B21, B22 of a flap a position sensor 22 is arranged that determines the current position of the respective flap and transmits this position value, by way of a line (not shown), to the control and monitoring device 5.

In addition, on the ends of the rotary-shaft drive trains 11 or 12 an asymmetry sensor 23 is arranged, which is also functionally connected, by way of a line (not shown), to the control and monitoring device 5, and by way of this line transmits a current value to the control and monitoring device 5, which value states whether the ends of the rotary-shaft drive trains 11 or 12 are rotated within a predetermined region, or whether an asymmetrical rotary position of the rotary drive shafts 11 or 12 exists.

Furthermore, at a position of the rotary drive shafts 11 or 12 that is situated in an outer region of the respective wing, in each case a wing-end region brake WTB is arranged which when activated can block the respective drive train 11 or 12. Each of the wing-end region brakes WTB is functionally connected, by way of a line (not shown either), to the control and monitoring device 5, and by way of this line can be controlled and activated by the control and monitoring device 5. In operation the normal initial state of the wing-end region brake WTB is a non-activated state in which said brake does not intervene with the rotation of the rotary drive shafts 11 or 12. In the case of a corresponding control signal from the control and monitoring device 5 the wing-end region brakes WTB can be activated in order to stop rotation of the respectively associated rotary drive shafts 11 or 12.

Both brake mechanisms B1, B2 are functionally connected to the control and monitoring device 5 which when predetermined conditions are met can operate the brake mechanisms B1, B2 and in so doing can stop rotation of the rotary-shaft drive trains 11, 12. If one of the two drive motors, the hydraulic motor H or the electric drive E is switched off, because of the differential, which is designed in such a way that the outputs provided by the hydraulic motor H and the electric motor are summed, the central drive unit 7 provides an output that is reduced by the amount from the switched-off drive motor.

Mechanical faults in the flap actuating mechanisms A11, A12, A21, A22, B11, B12, B21, B22, for example any jamming of a component of a flap actuating mechanism or of the rotary-shaft drive trains 11, 12 or any failure of a rotary drive shaft of a rotary-shaft drive train 11, 12 can result in undesirable behaviour of the device, for example asymmetrical operation of the flap elements, which will be detected by the control and monitoring device 5 by means of the signals transmitted by the asymmetry sensors 23. Thereafter, the control computer 5 transmits a switch-off signal to the wing-end region brake WTB in order to activate the wing-end region brakes WTB and to stop rotation of the rotary drive shafts 11, 12.

If there is an inadmissible difference between the desired positions determined by the control and monitoring device 5 and the actual positions determined by the position sensors 22, the control and monitoring device 5 transmits an actuating signal to the wing-end region brake WTB and to the brake mechanisms B1, B2 in order to stop rotation of both shaft drive trains 11, 12.

SUMMARY OF THE INVENTION

It is the object of the invention to provide a fault-tolerant high-lift system for adjusting the flaps of an aircraft and a method for monitoring a fault-tolerant actuating system, which system or method for monitoring an actuating system, respectively, while involving relatively modest component expenditure ensures the best possible functional safety.

This object is met by one or more embodiments disclosed and/or described herein. Further embodiments are also disclosed and/or described herein.

The invention provides in particular for a fault-tolerant actuating system with at least one flap, adjustable on a respective, wing of an aircraft, and with a control and monitoring device, comprising:

drive devices that are functionally connected to the control and monitoring device, with one of these drive devices in each case being associated with a flap, wherein each flap in each case is associated with a drive device, in each case comprising: two drive motors, two brake mechanisms, wherein each drive motor is associated with a brake mechanism for stopping rotation of the output of the respective drive motor, a differential that couples the outputs of the aforesaid to the aforesaid in a summing manner, an output shaft for coupling the output of the differential to drive connections, and a differential lock that is functionally connected to the control and monitoring device, wherein each of the brake mechanisms as well as the differential lock can be operated by means of a command signal from the control and monitoring device;

adjustment devices, at least two of which are arranged on each flap so as to be spaced apart from each other in the wingspan direction of the flap, with the adjustment devices being coupled, in each case by way of a drive connection, to the drive device associated with the flap, wherein each adjustment device in each case comprises: a transmission gear unit, an adjustment mechanism and a position sensor that is functionally connected to the control and monitoring device for acquiring the adjustment state of the flap;

wherein the control and monitoring device comprises:
an actuating function for generating command signals for the drive motors for adjusting the flap,
a monitoring function by means of which a command signal is transmitted to both brake mechanisms and to the differential lock for operating the aforesaid when the control and monitoring device based on a comparison of sensor values of the position sensors of two different adjustment devices of a flap determines different adjustment states that exceed a predetermined extent.

In the solution according to the invention a fault in one of the two brake mechanisms of the drive device, for example slipping of the brake mechanism or separation of a drive motor from the differential, is sensed by the position sensors on the flap, because by way of the differential unwanted running-away of the flap results. In this case of this fault, or in combination with the shaft failure described above, stopping rotation of the remaining shaft drive train of the drive connection is not possible with hitherto-known differential arrangements. According to the invention, this problem is solved by the monitoring function in conjunction with the differential lock that locks the differential in such instances of a fault occurring, thus engaging the remaining, intact, brake device of the respective other drive motor. In this way the full brake moment is applied to the shaft drive train of the drive connections, and rotation of the flap is safely stopped.

By providing a differential lock, the fault of a defective brake mechanism is covered so that it is not necessary to provide a wing-end region brake WTB on the rotary shafts of the drive connections. Likewise, in this arrangement it is possible to avoid the use of so-called system torque limiters: in the case of a station jamming, the design loads are not exceeded by the drive device because, in contrast to conventional arrangements, the drive devices can be designed specifically for a flap. Because of the position sensors on the flaps, it is also possible to do without position feedback sensors in the drive device for the purpose of determining position feedback on the drive device, which position feedback sensors are provided according to the state of the art. However, in certain applications these components can nevertheless be integrated in order to improve the functionality and/or the fault tolerance of the system according to the invention.

In this context the term "flaps" refers to actuating flaps on the airfoils of an aircraft, for example landing flaps, ailerons, spoilers or rudders as well as slats.

Furthermore, in the context of presenting the invention, the term "signal" relates to any type of value transmitted between functional modules, for example an analogue signal value or a digital value.

In the context of presenting the invention the term "functional connection" can, for example, be an analogue signal connection or a digital data connection.

The actuating system according to the invention can, in particular, be a high-lift system.

BRIEF DESCRIPTION OF THE DRAWINGS

Below, exemplary embodiments of the invention are described with reference to the enclosed figures that show the following.

DETAILED DESCRIPTION OF THE INVENTION

The invention is described using a drive system for landing flaps A1, A2; B1, B2 as an example; however, it can be used in general for flaps or aerodynamic bodies that are adjustable on a main wing. Each flap A1, A2; B1, B2 is movable between a retracted position and several extended positions by means of a respective associated drive device PA1, PA2, PB1, PB2.

Figure 1:
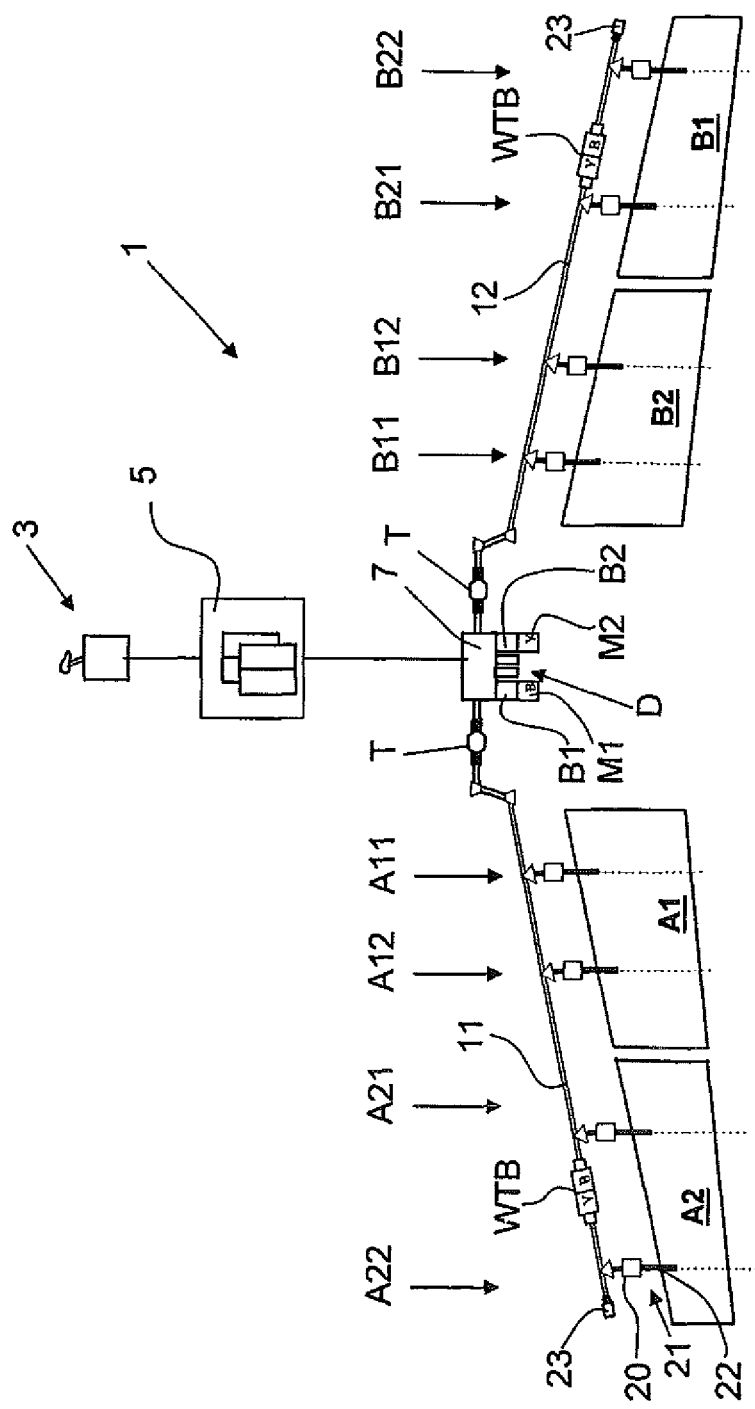
FIG. 1 illustrates a functional representation of a known high-lift system.
Figure 2:
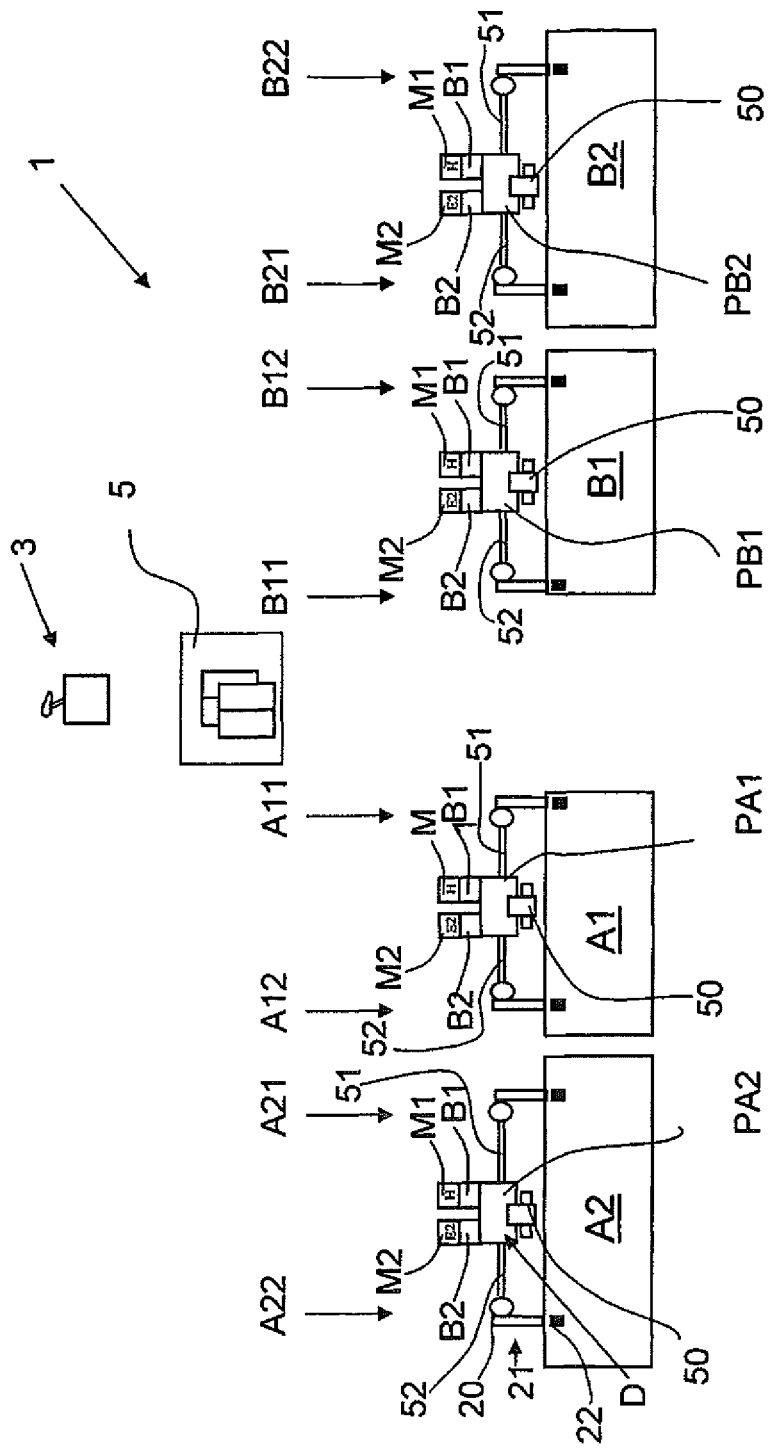
FIG. 2 illustrates a functional representation of an exemplary embodiment of the fault-tolerant actuating system according to the invention, using as an example a high-lift system for adjusting landing flaps, wherein some components of the high-lift system of FIG. 2 that have similar functions to those in FIG. 1 have the same reference characters.

The actuating system or high-lift system 1 shown in FIG. 2 is provided for adjusting at least one landing flap on each wing. In the exemplary embodiment shown in FIG. 2, two aerodynamic bodies or flaps are shown for each wing (with the not shown in FIG. 1): an inner flap A1 and an outer flap A2 on a first wing, and an inner flap B1 and an outer flap B2 on a second wing. In the high-lift system according to the invention it is also possible to use more than two flaps per wing.

In each case, each aerodynamic body or each flap is associated with a drive unit, wherein the drive devices PA1 or PB1 are coupled to the inner flaps A1, B1, and the drive devices PA2 or PB2 are coupled to the outer flaps A2, B2.

The drive devices PA1, PA2, PB1, PB2 can be operated and controlled automatically or by way of a pilot interface 3 that, in particular, comprises an actuating member, for example an actuating lever. The pilot interface 3 is functionally coupled to a control and monitoring device 5. The control and monitoring device 5 is functionally connected to each drive device PA1, PA2, PB1, PB2, wherein in each case each aerodynamic body A1, A2; B1, B2 is associated with a respective drive device PA1, PA2, PB1, PB2.

Coupled to the drive devices PA1, PA2, PB1, PB2 are two drive connections 51, 52 with drive shafts that are driven by the drive devices PA1, PA2, PB1, PB2. Each of the drive connections 51, 52 is coupled to an adjustment mechanism 21.

Each of the drive devices PA1, PA2, PB1, PB2 comprises:
two drive motors, for example a hydraulic motor H and an electric drive E,
two brake mechanisms B1 and B2, of which a first brake mechanism B1 is associated with the one drive motor, and the second brake mechanism B2 is associated with the other drive motor H in order to stop the outputs of the first or second drive motor respectively from rotating, wherein each of the brake mechanisms B1, B2 can be operated by a command signal of the control and monitoring device 5,
a differential whose output is coupled to the drive motors in such a manner that in each case the respective outputs from the hydraulic motor H and the electric motor are summed and are transmitted to the drive trains 51, 52,
a differential lock 50 that is functionally connected to the control and monitoring device 5.

The two drive motors M1, M2 can, in particular, be two independent drive motors whose speed can be regulated. Furthermore, the two drive motors M1, M2 can comprise two hydraulic drives or two electric drives or a combination of a hydraulic drive and an electric drive.

The brake mechanisms B1 and B2 are in each case functionally connected to the control and monitoring device 5 which when predetermined conditions are met can stop each of the outputs of the brake mechanisms B1, B2 from rotating, i.e. can prevent one or both of the drive motors M1, M2 from transmitting output power to the drive unit 7.

A differential lock 50 that is functionally connected to the control and monitoring device 5 is integrated in the differential and is designed in such a way that said differential lock 50 can intervene with the output of the differential and can block said output so that the drive connections 51, 52 coupled to the differential are not driven. The differential lock 50 is functionally connected to the control and monitoring device 5 so that the control and monitoring device 5 can generate a brake signal and can send it to the differential lock 50, in response to which the output of the differential D is stopped.

On each flap A1, A2 or B1, B2 at least two adjustment devices A11, A12, A21, A22; B11, B12, B21, B22 are arranged, each comprising a flap kinematic with a fixed pivot. To each of the adjustment devices A11, A12, A21, A22; B11, B12, B21, B22 one of the two respective drive connections 51, 52 is coupled, which in turn in each case are coupled to one of the drive devices PA1, PA2, PB1, PB2. In the high-lift system shown in FIG. 2, on each flap in each case two adjustment devices are arranged, namely on the inner flaps A1 and B1 the adjustment devices A11, A12 or B11, B12, and on the outer flaps A2 and B2 the adjustment devices A21, A22 or B21, B22.

Each of the adjustment devices A11, A12, B11, B12, A21, A22, B21, B22 is associated with a transmission gear unit 20, adjustment kinematics 21 with a fixed pivot, and a position sensor 22. Generally speaking, the transmission gear unit 20 can be implemented by a spindle drive or a rotary actuator. The transmission gear unit 20 is mechanically coupled to the respective rotary-shaft drive train 51 or 52; it translates a rotary movement of the respective drive train 51 or 52 to an adjustment movement of the flap region that is coupled to the respective adjustment mechanism.

On each drive station of a flap a position sensor 22 is arranged that determines the current position of the respective flap and transmits this position value to the control and monitoring device 5 by way of a line (not shown).

When activating the brake mechanisms B1, B2 the drive devices PA1, PA2, PB1, PB2 do not generate any output power to the drive connections, and consequently none of the actuators 20 associated with the respective aerodynamic body are activated. When the differential lock 50 is activated, a relative movement between the arrangement comprising the first drive motor M1 and the first brake mechanism B1, and the arrangement comprising the second drive motor M2 and the second brake mechanism B2 is prevented.

The control and monitoring device 5 comprises:
an actuating function for generating command signals for the drive motors M1, M2 for adjusting the flap,
a monitoring function by means of which a command signal is transmitted to both brake mechanisms B1, B2 and to the differential lock D for confirming the aforesaid when the control and monitoring device 5 based on a comparison of sensor values of the position sensors on two different adjustment devices of a flap determines different adjustment states that exceed a predetermined extent.

Mechanical faults, for example associated with the drive connections or an actuator or an adjustment mechanism, for example jamming of a component of the flap adjustment mechanism or a failure of a rotary shaft of a rotary-shaft drive train can, in particular, lead to asymmetrical actuating of the flap elements, which the control and monitoring device 5 detects by means of its monitoring function based on the signals transmitted from the position sensors 22. After this the control device 5 transmits a switch-off signal to the brake mechanisms B1, B2, and in addition in the described manner activates the differential lock so that the drive device of the respective aerodynamic body does not transmit any output power to the drive connections.

The monitoring function of the control device 5 detects different adjustment states on two different adjustment devices A11, A12 or A21, A22 or B11, B12 or B21, B22 of a flap on the basis of a comparison of the actuating signals commanded in relation to the respective flap with the actual positions of the flap, which actual positions are derived from the sensor values of the position sensors arranged on the respective aerodynamic body. If the control and monitoring device 5 identifies different adjustment states on two different adjustment devices of a flap, this is considered by the control and monitoring device 5 as being a defect in one of the adjustment devices or in one of the drive connections 51, 52 on a flap, which is then considered to be "defective". The monitoring function of the control and monitoring device 5 is designed in such a manner that the affected flap is then no longer operated. In the embodiment of the actuating system according to the invention as a high-lift system, said actuating system is preferably designed in such a manner that in this case the flap that is arranged on the other wing, analogously to the above-mentioned affected flap, is no longer operated. As far as fault location is concerned, the system according to the invention provides advantages in particular in the design as a high-lift system, because more precise narrowing down of a fault to a specific flap becomes possible, for example in the case of jamming or certain mechanical disconnections or failures.

In an actuating system comprising two flaps on each wing, as shown in FIG. 2, in the described failure of a flap it is not necessary to stop all four flaps from operating. As a result of the arrangement according to the invention, in each case of a drive device PA1, PA2, PB1, PB2 with adjustment devices A11, A12, A21, A22; B11, B12, B21, B22 and drive connections 51, 52, which connect the aforesaid, on each flap, a further flap on the same wing can remain active so that the actuating system overall still remains functional.

In order to compensate for any failure in the flap, the control and monitoring device 5 can be designed in various ways: for example, the aerodynamic body of the other wing, which aerodynamic body is analogous to the failed aerodynamic body, i.e. which body in relation to the longitudinal axis of the aircraft is situated so as to be symmetrical to the failed aerodynamic body, can also switch off and can carry out the intended control function by way of other aerodynamic bodies that are still controllable on the aircraft. The control and monitoring device can also be designed in such a manner that all further aerodynamic bodies remain active, and that they are controlled evenly, or distributed according to priorisation, in order to bring about an intended desired position of the aircraft.

In the system according to the invention in each case short rotary-shaft drive trains 51, 52 connect the local drive devices PA1, PA2, PB1, PB2, which are associated with a flap or landing flap, by means of the associated local mechanical adjustment kinematics 21 and transmission gear units 20. This provides a further advantage of the system according to the invention when compared to a system comprising drive devices on each adjustment device, in that the transmission gear units 20 of a flap are mechanically coupled by way of the local drive device and short shaft drive trains of the drive connections 51, 52. In this way easy and simple synchronisation of the two transmission gear units 20 of a flap A1, A2 or B1, B2 are achieved so that so-called force fighting on the respective transmission gear units 20 of a flap is avoided. Furthermore, in the actuating system according to the invention it is not necessary to provide the components that are required in a system comprising a through rotary-shaft drive train, for example a multitude of bearings, multi-tooth elements, universal joints, and corresponding gear arrangements to bridge substantial changes in direction. This applies in particular to the rotary shaft component of a central drive (FIG. 1), which leads from the fuselage into the wing. It is in this region that the greatest saving of rotary shaft components can be achieved with the use of the invention. In this way, maintenance work such as lubrication or checking the fill level of gear oil in relation to these components is either eliminated altogether or is reduced as far as the associated effort and expenditure are concerned.

Furthermore, with the system according to the invention in the embodiment as a landing flap system or high-lift system that involves independent moving and positioning of the respective inner or outer pairs of flaps A1, B1 or A2, B2 when compared to known systems, wing optimisation, especially on the trailing edge, can be implemented particularly well. This relates, in particular, to a wing-profile curvature adjustment during cruising, with reducing aircraft weight as a result of fuel consumption in order to reduce the aerodynamic resistance or drag, or to a wing-profile curvature adjustment in the takeoff- and landing configurations depending, among other things, on the weight, for reducing the maximum wing bending moments.

Since all the flaps A1, A2 or B1, B2 are mechanically decoupled, with this arrangement it is, furthermore, possible to help compensate for the extreme asymmetrical flight state in the case of failure of an engine, by means of corresponding asymmetrical, i.e. differing, flap positions between the left-hand and the right-hand flaps A1, A2 or B1, B2 of a wing. While in the case of known high-lift systems this was only possible for primary flight control elements such as rudders, ailerons, to some extent also airbrake flaps, in the case of the actuating system according to the invention the landing flaps with their great potential roll authority are added to the available options.

Moreover, the system according to the invention makes possible the use of different flap movements, i.e. different and independent movements and positioning of the outer pairs of landing flaps A2, B2 relative to the inner pairs of landing flaps A1, B1, which is not possible with a central drive unit and a single rotary-shaft drive train (FIG. 1).

The invention claimed is:

1. A fault-tolerant actuating system, comprising:
   at least one flap, adjustable on a respective wing of an aircraft;
   a control and monitoring device;
   drive devices that are functionally connected to the control and monitoring device, each drive device being associated with a respective flap, each drive device comprising: (i) two drive motors, and two brake mechanisms, wherein each drive motor is associated with a respective brake mechanism for stopping rotation of an output of the respective drive motor, (ii) a differential that couples the outputs of the two drive motors in a summing manner, (iii) an output shaft for coupling an output of the differential to drive connections, and (iv) a differential lock that is functionally connected to the control and monitoring device, wherein each of the brake mechanisms as well as the differential lock are operated by means of a command signal from the control and monitoring device;
   adjustment devices, at least two of which are arranged at each flap so as to be spaced apart from each other in the wingspan direction of the flap, with the adjustment devices being coupled, in each case by way of a drive connection, to the drive device associated with the flap, wherein each adjustment device in each case comprises: a transmission gear unit, an adjustment mechanism and a position sensor that is functionally connected to the control and monitoring device for acquiring the adjustment state of the flap;
   wherein the control and monitoring device comprises:
   an actuating function for generating command signals for the drive motors for adjusting the flap, and a monitoring function that transmits a command signal to (i) both brake mechanisms of the drive device associated with the respective flap for operating the respective brake mechanisms in order to prevent rotation of the respective drive motors and (ii) to the differential lock of the drive device associated with the respective flap such that the differential lock locks the differential, so that the full brake moment of both brake mechanisms of the respective flap is applied to the drive connections based on a comparison of sensor values of the position sensors of two different adjustment devices of the respective flap that determines different adjustment states of the respective flap.

2. The fault-tolerant actuating system according to claim 1, wherein the transmission gear unit comprises a rotary actuator.

3. The fault-tolerant actuating system according to claim 1, wherein the transmission gear unit comprises a linear drive.

4. The fault-tolerant actuating system according to claim 1, wherein the two drive motors are electrical drive motors.

5. The fault-tolerant actuating system according to claim 1, wherein one of the two drive motors is an electrical drive motor, and the other drive motor is a hydraulic drive motor.

6. The fault-tolerant actuating system according to claim 1, wherein the two drive motors are hydraulic drive motors.

7. The fault-tolerant actuating system according to claim 1, wherein the actuating system is a high-lift system.

8. A method for monitoring an actuating system system, the actuating system comprising:
at least one flap, adjustable on a respective wing of an aircraft;
a control and monitoring device;
drive devices that are functionally connected to the control and monitoring device, each drive device being associated with a respective flap, each drive device comprising: (i) two drive motors, and two brake mechanisms, wherein each drive motor is associated with a respective brake mechanism for stopping rotation of an output of the respective drive motor, (ii) a differential that couples the outputs of two drive motors in a summing manner, (iii) an output shaft for coupling an output of the differential to drive connections, and (iv) a differential lock that is functionally connected to the control and monitoring device, wherein each of the brake mechanisms as well as the differential lock are operated by means of a command signal from the control and monitoring device;
adjustment devices, at least two of which are arranged at each flap so as to be spaced apart from each other in the wingspan direction of the flap, with the adjustment devices being coupled, in each case by way of a drive connection, to the drive device associated with the flap, wherein each adjustment device in each case comprises: a transmission gear unit, an adjustment mechanism and a position sensor that is functionally connected to the control and monitoring device for acquiring the adjustment state of the flap;
the method comprising the following steps:
generating command signals for the drive motors for adjusting the flap,
transmitting a command signal to (i) both brake mechanisms of the drive device associated with the respective flap for operating the respective brake mechanism in order to prevent rotation of the respective drive motors and (ii) to the differential lock of the drive device associated with the respective flap such that the differential lock locks the differential, so that the full brake moment of both brake mechanisms of the respective flap is applied to the drive connections based on a comparison of sensor values of the position sensors of two different adjustment devices of the respective flap that determines different adjustment states of the respective flap.

9. The method according to claim 8, wherein the transmission gear unit comprises a rotary actuator.

10. The method according to claim 8, wherein the transmission gear unit comprises a linear drive.

11. The method according to claim 8, wherein the two drive motors are electrical drive motors.

12. The method according to claim 8, wherein one of the two drive motors is an electrical drive motor, and the other drive motor is a hydraulic drive motor.

13. The method according to claim 8, wherein the two drive motors are hydraulic drive motors.

14. The method according to claim 8, wherein the actuating system is a high-lift system.

\* \* \* \* \*